(12) United States Patent
Patel et al.

(10) Patent No.: US 12,323,726 B2
(45) Date of Patent: Jun. 3, 2025

(54) METHOD AND SYSTEM FOR AUTOMATIC CAMERA SWITCHING

(71) Applicant: Verizon Patent and Licensing Inc., Basking Ridge, NJ (US)

(72) Inventors: Haren H. Patel, Alpharetta, GA (US); Sourabh Khire, San Jose, CA (US); Nithin A. Prakash, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 214 days.

(21) Appl. No.: 18/059,000

(22) Filed: Nov. 28, 2022

(65) Prior Publication Data
US 2024/0179268 A1     May 30, 2024

(51) Int. Cl.
*H04N 5/268*    (2006.01)
*G06V 40/16*    (2022.01)
*G06V 40/20*    (2022.01)

(52) U.S. Cl.
CPC .......... *H04N 5/268* (2013.01); *G06V 40/161* (2022.01); *G06V 40/20* (2022.01)

(58) Field of Classification Search
CPC .............................. H04N 5/268; G06V 40/161
See application file for complete search history.

(56) References Cited

U.S. PATENT DOCUMENTS

2021/0051298 A1\*   2/2021   Atkins .................... H04N 7/147
2022/0400216 A1\*  12/2022   Wang ...................... G10L 25/78

\* cited by examiner

*Primary Examiner* — Amal S Zenati

(57) ABSTRACT

A method, a device, and a non-transitory storage medium are described in which a multi-camera switching service is provided. The service may include support of the use of multiple cameras by a user in a video-based communication session. The service may automatically switch between cameras during the session based on switching camera criteria and other configuration data. The service may include facial detection, default camera settings, debouncing, and blending services. The service may also allow the user to transmit a video feed to a subset of participants.

20 Claims, 10 Drawing Sheets

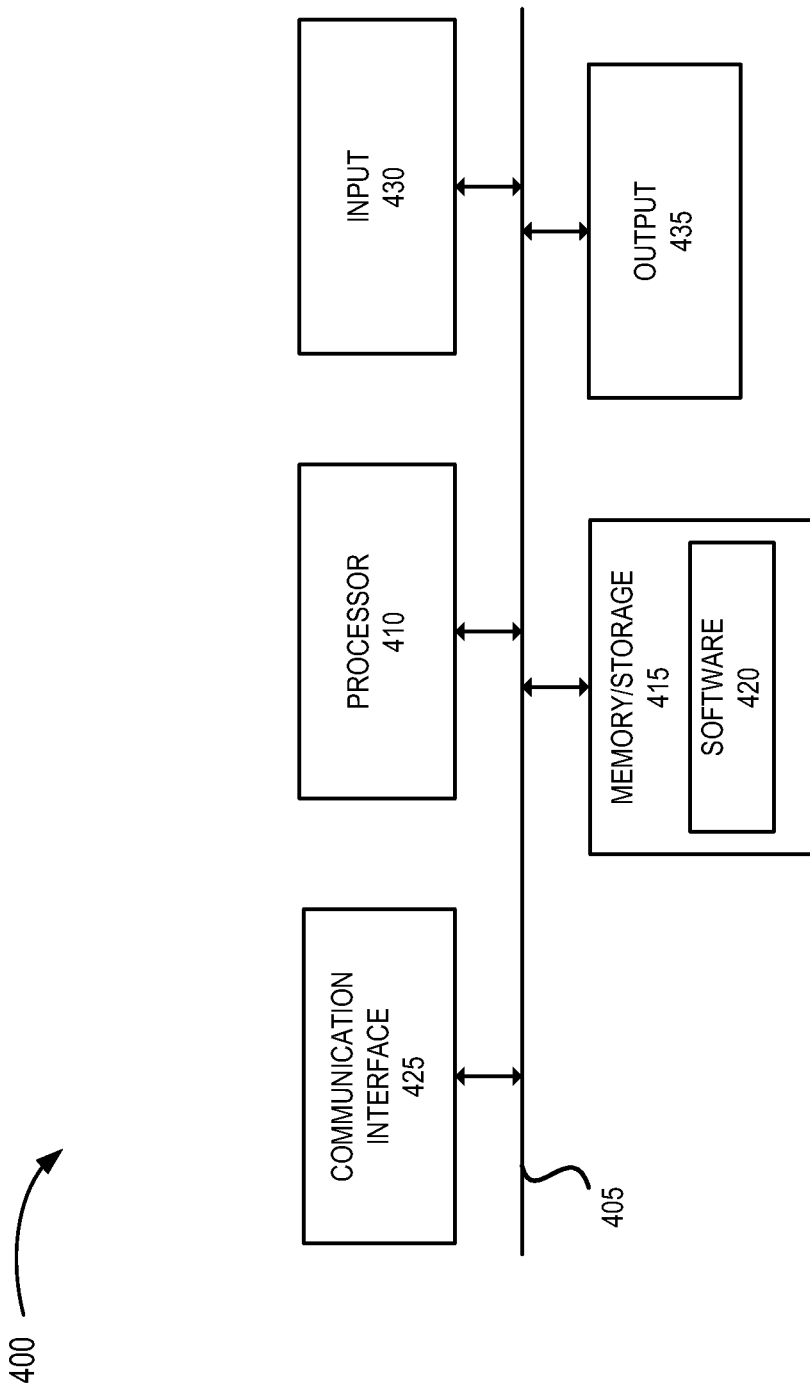

METHOD AND SYSTEM FOR AUTOMATIC CAMERA SWITCHING

BACKGROUND

Video conferencing applications typically allow a user to join a video session using a single camera. Given this framework, the user may interact with other users via a single fixed camera.

BRIEF DESCRIPTION OF THE DRAWINGS

FIG. 4 is a diagram illustrating exemplary components of a device that may correspond to one or more of the devices illustrated and described herein;

DETAILED DESCRIPTION

Figure 1:
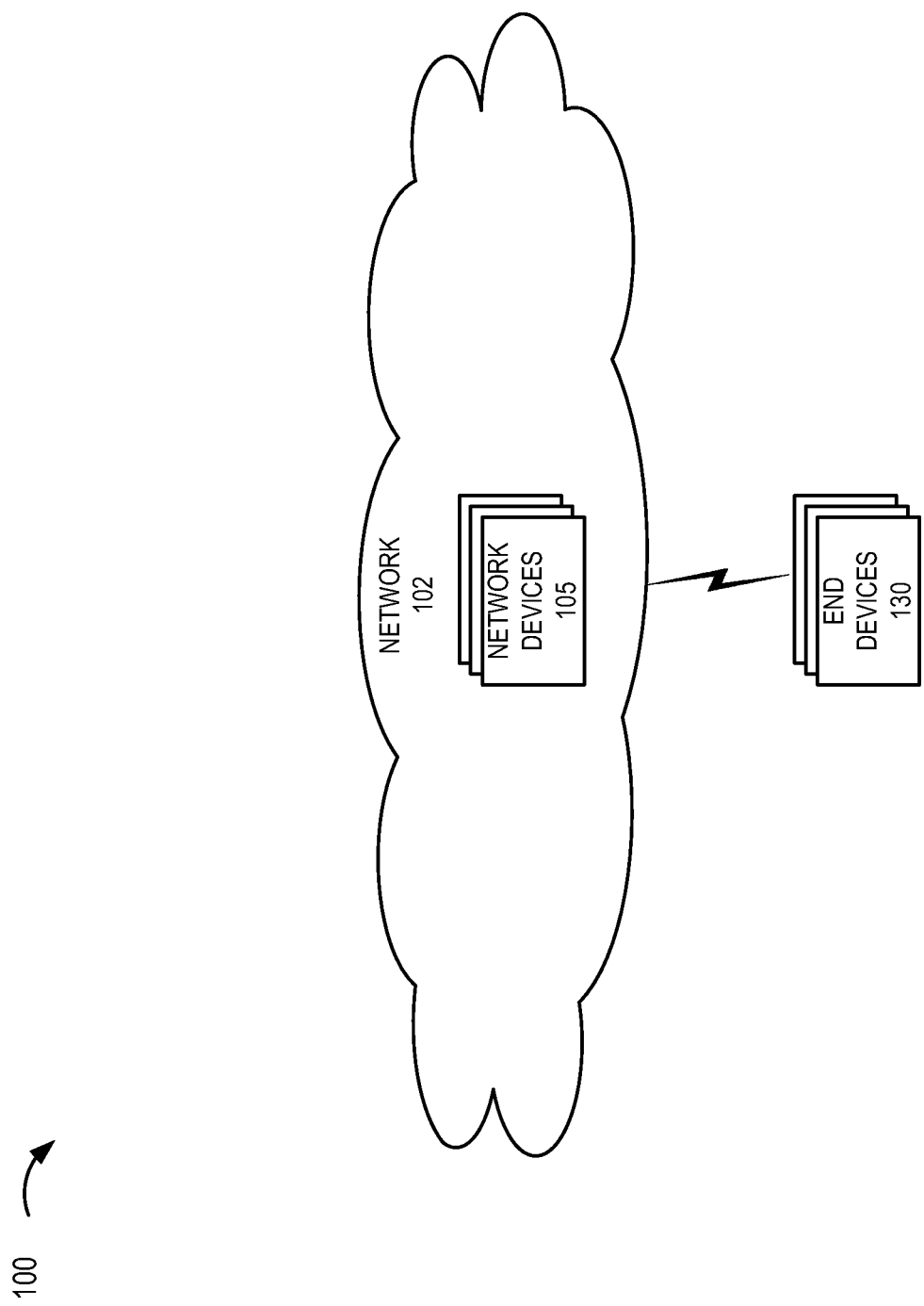
FIG. 1 is a diagram illustrating an exemplary environment in which an exemplary embodiment of a multi-camera switching service may be implemented.

The following detailed description refers to the accompanying drawings. The same reference numbers in different drawings may identify the same or similar elements. Also, the following detailed description does not limit the invention.

Video conferencing software and the like may allow each participant to join a communication session using a single camera and optionally allowing the use of a secondary camera input for screen sharing. However, the inability for a participant to join the session using multiple cameras may limit the potential for interaction among participants. For example, depending on the context of the communication session, a participant is unable to use multiple cameras directed to different participants of the communication session. By way of further example, a video session may include an interviewer, a panel of interviewees, an in-person audience, and a remote audience.

In addition to the limitations of single camera usage, there are other issues to consider, such as the ability to manage the usage of a multi-camera system. For example, the participant may be unable to manage the usage of the multi-camera system while concurrently participating in the communication session.

According to exemplary embodiments, a multi-camera switching service is described. According to an exemplary embodiment, the multi-camera switching service may include automatic camera switching. According to an exemplary embodiment, the automatic camera switching may be based on facial detection, user position (e.g., head position, body position, torso position, shoulder position, etc.), and/or other criteria (e.g., user gesticulations, user preferences, etc.), as described herein.

According to an exemplary embodiment, the multi-camera switching service may include computer vision logic and/or other types of machine learning and/or artificial intelligence (ML/AI) logic. According to an exemplary embodiment, multi-camera switching service logic may be implemented on an end device, as described herein. According to another exemplary embodiment, multi-camera switching service logic may be implemented on a network device. According to still other exemplary embodiments, multi-camera switching service logic may be implemented collaboratively between the end device and the network device. According to various exemplary embodiments, the multi-camera switching service may be implemented according to different architectures including a selective forwarding unit (SFU) architecture, a multipoint control unit (MCU) architecture, a peer-to-peer (P2P) architecture, an experience delivery network (XDN) architecture, or another suitable architecture that may support video-based communication, conferencing, and/or meeting collaboration between end devices.

According to an exemplary embodiment, the multi-camera switching service may include debouncing logic to avoid frequent camera switches, as described herein. According to an exemplary embodiment, the multi-camera switching service may include blending logic that may blend between camera feeds, as described herein. According to an exemplary embodiment, the multi-camera switching service may include user management logic that may enable the user to configure parameters and/or user preferences pertaining to the multi-camera switching service, as described herein. For example, the user management logic may allow a user to select a default camera which may be used if multiple faces or no faces are detected in any of the camera feeds, configure threshold values, and other aspects of the multi-camera switching service, as described herein.

In view of the foregoing, the multi-camera switching service may support the use and management of a multi-camera system during a communication session among users. The multi-camera switching service may improve the quality of the communication session and user experience during the communication session. Additionally, the multi-camera switching service may avoid significant costs associated with video production (e.g., equipment, camera operators, etc.) to achieve comparable results.

FIG. 1 is a diagram illustrating an exemplary environment 100 in which an exemplary embodiment of a multi-camera switching service may be implemented. As illustrated, environment 100 may include a network 102. Network 102 may include network devices 105 (also referred to individually or generally as network device 105). Additionally, as illustrated, environment 100 may include end devices 130 (also referred to individually or generally as end device 130).

The number, type, and arrangement of networks illustrated and described in environment 100 are exemplary. For example, according to other exemplary embodiments, environment 100 may include fewer networks, additional networks, and/or different networks.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into various types of network architectures (e.g., Software Defined Networking (SDN), virtual, logical, network slice, etc.). The number, the type, and the arrangement of network devices illustrated and described are exemplary. For purposes of description, an end device is not considered a network device.

Environment 100 includes communication links between the network devices and between end devices and a network. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1 and potentially not illustrated in other Figures of this disclosure. A direct communicative connection may not involve an intermediary device and/or an intermediary network. The number, type, and arrangement of communication links illustrated and described in environment 100 are exemplary.

Environment 100 may include various planes of communication including, for example, a control plane, a user plane, a service plane, and/or a network management plane. Environment 100 may include other types of planes of communication. According to various exemplary implementations, the interface of the network device may be a service-based interface, a reference point-based interface, an Open Radio Access Network (O-RAN) interface, a Fifth Generation (5G) interface, another generation of interface (e.g., 5.5G, Sixth Generation (6G), Seventh Generation (7G), etc.), or some other type of interface (e.g., proprietary, etc.).

Referring to FIG. 1, network 102 may include one or multiple types of networks of one or multiple types of technologies. Network 102 may be implemented to include a cloud network, a private network, a public network, an application layer service network, the Internet, a packet data network (PDN), a service provider network, a data center, a radio access network (RAN), a core network, and/or another type of network that may provide access to and may provide a multi-camera switching service.

According to an exemplary embodiment, network 102 may be implemented using one or multiple technologies including, for example, network function virtualization (NFV), SDN, cloud computing, Infrastructure-as-a-Service (IaaS), Platform-as-a-Service (PaaS), Software-as-a-Service (Saas), or another type of network technology.

Depending on the implementation, network 102 may include one or multiple types of network devices, such as network devices 105. For example, network devices 105 may include a multi-access edge computing (MEC) device or another type of application layer service network device (e.g., cloud device, a server device, a web server device, etc.) that may provide a multi-camera switching service. Network devices 105 may include a network device that hosts a video-based communication application/service. According to various exemplary embodiments, the video-based communication application service may include the multi-camera switching service or the multi-camera switching service may be a standalone service (e.g., a microservice) that may interface (e.g., via an application programming interface (API)) with a third party video-based communication application service.

Network device 105 may include analytics that may determine camera selection for transmission of a video feed associated with a user and a communication session to other participants. According to an exemplary embodiment, the analytics may include computer vision logic and/or other types of ML/AI logic that may analyze data (e.g., in real-time) based on one or multiple types of criteria. For example, the criteria may include facial detection, user position, and gesticulations associated with the user. As described herein, the multi-camera switching service logic may automatically set the video feed from a particular camera to be transmitted to one or multiple participants of the communication session. The multi-camera switching service logic may include determinations as to which of the other participants the video feed may be sent. For example, some (e.g., on an individual basis, a group basis, a sub-group basis, etc.) or all of the other participants may or may not receive the current and/or live (current/live) video feed. According to an exemplary embodiment, a participant that may not receive the current/live video feed may instead receive a looped video feed or still picture of the user that may have been previously captured and/or stored relative to the current/live video feed. For example, the previously captured video feed or still picture may be captured as a part of the establishment of the communication session or at the very beginning of an established communication session.

According to some exemplary embodiments, the multi-camera switching service logic may be implemented according to various architectures, such as an SFU, an MCU, a P2P, an XDN, or another type of suitable configuration or architecture that may support video-based communication, conferencing, and/or meeting collaboration between end devices 130, as described herein.

According to an exemplary embodiment, network device 105 may include debouncing logic to avoid frequent ping-ponging between cameras. For example, the debouncing service may minimize frequent switching due to faulty face detection and/or other criteria detection (e.g., user position, gesticulation, user preferences, etc.), when the user's face/position are captured substantially equally well or substantially equally poorly by multiple cameras. The user may be able to configure settings related to the debouncing service via the user management service, as described herein. For example, the user may configure the number of permitted times of switching between cameras within a time period. Additionally, for example, the user may configure criteria for selecting a camera among multiple cameras to be used to avoid frequent ping-ponging. For example, if the multiple cameras associated with the ping-ponging effect includes a default camera, the debouncing logic may select and use the camera feed of the default camera to minimize a frequent switching situation.

According to an exemplary embodiment, network device 105 may include blending logic. For example, the blending service may blend camera feeds when switching between cameras to avoid abrupt transitions and provide a smooth transition. The user may be able to configure settings related to the blending service via the user management service, as described herein. For example, the user may configure parameters relating to video transitions, such as selection between fading, dissolving, or cutting, and other parameters that may relate to time period, etc.

According to an exemplary embodiment, network device 105 may include user management logic. For example, the user management service may provide a user interface (e.g., a graphical user interface (GUI)) that enables the user to manage and configure settings and user preferences relating to the multi-camera switching service. For example, the user may be able to configure parameters, parameter values, and/or user preferences relating to the debouncing service, the blending service, selection of a default camera (e.g., which may be invoked if multiple faces or no faces are detected in any of the camera feeds), selection and use of pre-trained gesticulations, selection of mappings between a gesticulation and its meaning (e.g., a right hand gesture may be selected to mean to switch to a particular camera among the multiple cameras), selection and mappings of cameras/camera feeds to other participants, and/or other types of user preferences that may be configurable by the user, as described herein.

According to an exemplary embodiment, the user management service may select the default camera automatically if the user does not select a default camera. According to various exemplary implementations, the selection of the default camera may be dynamic or static. For example, when automatically selected (versus user selected), the automatically selected default camera may change based on use during the communication session. For example, during the communication session, if a user happens to face a particular camera more often than the remaining cameras, the user management service may reselect the default camera (if different from the previously selected default camera). In this way, the flow of the user's interaction with other participants may dynamically influence the selection of the default camera.

According to an exemplary embodiment, the multi-camera switching service may determine which camera the user may be facing or substantially facing based on the switching criteria, as described herein. The determination may influence the selection of the camera feed to transmit as well as other services, such as selection of the default camera, the debouncing service, the blending service, and other services, as described herein.

According to some exemplary embodiments, however, the multi-camera switching service may select a camera feed of a camera that the user may not be facing. For example, for production value, the multi-camera switching service may randomly select a side view of the user for a preconfigured time period and then switch to the camera feed of the camera that the user may be facing. In this way, the user's interaction with other participants may be enhanced and less visually static. According to some exemplary embodiments, the user management service may enable the user to configure settings related to this feature, such as selection of one or more secondary cameras, period of time of secondary camera feed, and frequency of use over a given time period (e.g., twice over a 5 minute period or another defined frequency and time period).

Additionally, network devices 105 may include various network devices of a radio access network. For example, the radio access network may be implemented to include a Fifth Generation (5G) RAN, a future generation RAN (e.g., a 5.5 RAN, a Sixth Generation (6G) RAN, a Seventh Generation (7G) RAN, or a subsequent generation RAN), a centralized-RAN (C-RAN), an Open Radio Access Network (O-RAN), and/or another type of access network (e.g., a Fourth Generation (4G) RAN, a 4.5G RAN, etc.). By way of further example, network devices 105 may include a next generation Node B (gNB), an evolved Long Term Evolution (LTE) (eLTE) evolved Node B (eNB), an eNB, a radio network controller (RNC), a remote radio head (RRH), a baseband unit (BBU), a radio unit (RU), a remote radio unit (RRU), a centralized unit (CU), a distributed unit (DU), a 5G ultra-wide band (UWB) node, a future generation wireless access device (e.g., a 6G wireless station, a 7G wireless station, or another generation of wireless station), and/or the like. The network device(s) of the radio access network may support communication and connectivity between end device 130 and other network devices 105 of network 102 and the multi-camera switching service, as described herein.

Further, network devices 105 may include network devices of a core network. The core network may include a complementary network of the radio access network. For example, the core network may be implemented to include a 5G core network, an evolved packet core (EPC) of a Long Term Evolution (LTE) network, an LTE-Advanced (LTE-A) network, and/or an LTE-A Pro network, a future generation core network (e.g., a 5.5G, a 6G, a 7G, or another generation of core network), and/or another type of core network. Depending on the implementation of the core network, the core network may include diverse types of network devices, such as a user plane function (UPF), an access and mobility management function (AMF), a session management function (SMF), a unified data management (UDM) device, a unified data repository (UDR), an authentication server function (AUSF), a network slice selection function (NSSF), a network repository function (NRF), a policy control function (PCF), a network exposure function (NEF), a mobility management entity (MME), a packet gateway (PGW), a serving gateway (SGW), a home subscriber server (HSS), an authentication, authorization, and accounting (AAA) server, a policy and charging rules function (PCRF), a policy and charging enforcement function (PCEF), a charging system (CS), and/or another type of network device that may be well-known but not particularly mentioned herein.

End device 130 may include a device that has communication capabilities and computational capabilities. End device 130 may be implemented to include a mobile device, a portable device, and/or a stationary device (e.g., a non-mobile device and/or a non-portable device). For example, end device 130 may be implemented to include a smartphone, a mobile phone, a tablet, a netbook, a computer (e.g., desktop, laptop, etc.), a room system, or another type of user equipment (UE). End device 130 may include one or multiple peripheral devices, such as a display, a camera, and/or a microphone. According to an exemplary embodiment, end device 130 may include multiple cameras (e.g., two or more). As an example, a camera may be implemented as a separate or peripheral device (e.g., a web cam or another type of video camera) or may be integrated (e.g., a laptop computer with a camera, a mobile phone with a camera).

End device 130 may be configured to execute various types of software (e.g., applications, programs, etc.). The number and the types of software may vary among the end devices 130. According to an exemplary embodiment, end device 130 may include software that enables video-based communication, conferencing, and/or meeting collaboration between end devices 130. According to an exemplary embodiment, the multi-camera switching service may interface (e.g., via an API) with a third party video-based communication software. According to another exemplary embodiment, the multi-camera switching service may be included in a standalone and proprietary video-based communication software. For purposes of description, examples of video-based communication software may include BLUEJEANS™, ZOOM™, and the like.

According to some exemplary embodiments, end device 130 may provide the multi-camera switching service, as described in relation to network device 105. According to other exemplary embodiments, network device 105 and end device 130 may collaboratively provide the multi-camera switching service in which one or more processes, functions, steps, and/or services, in whole or in part, may be performed by network device 105 and end device 130.

Figure 2:
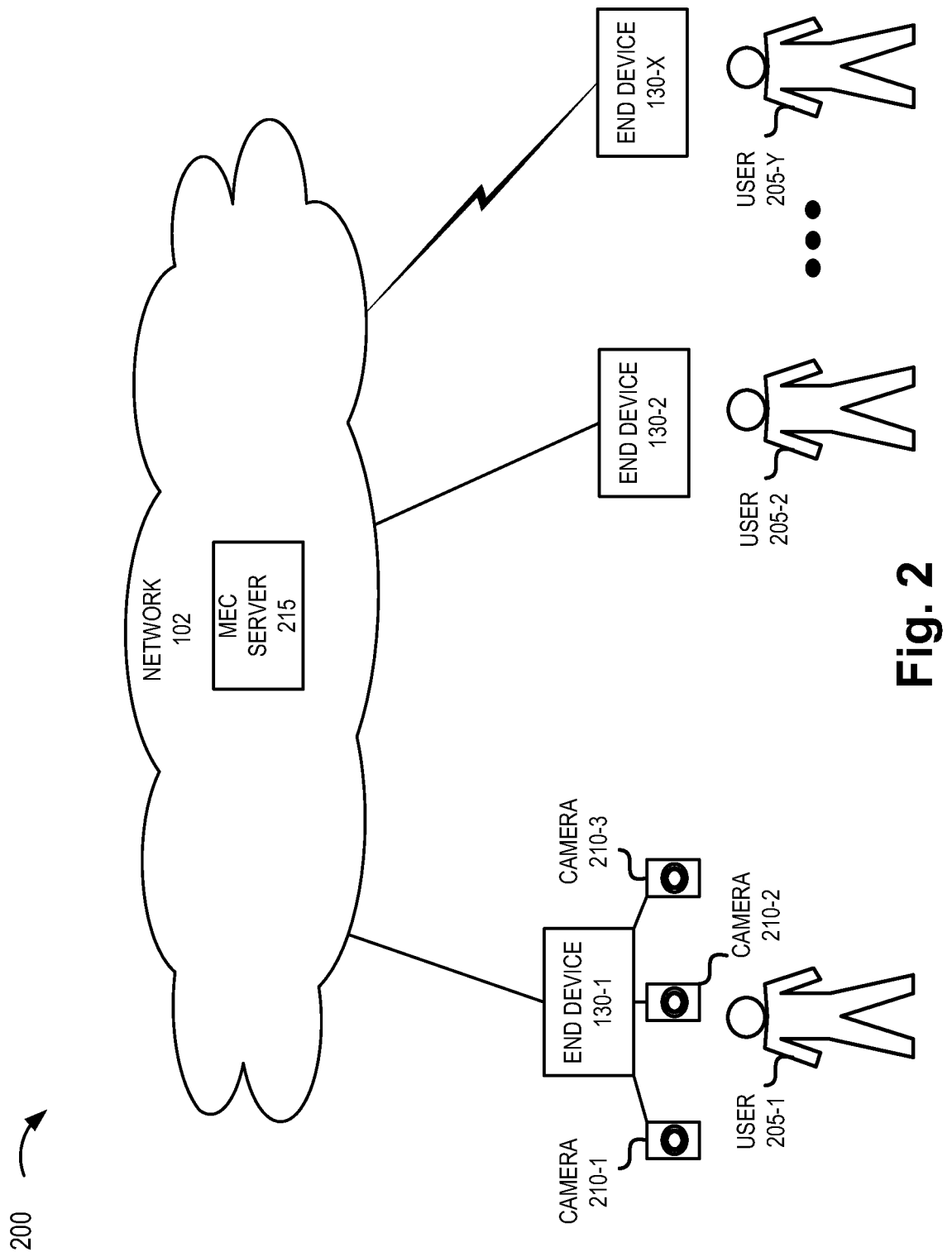
FIG. 2 is a diagram illustrating another exemplary environment in which an exemplary embodiment of the multi-camera switching service may be implemented.

FIG. 2 is a diagram illustrating another exemplary environment in which an exemplary embodiment of the multi-camera switching service may be implemented. As illustrated, environment 200 may include network 102 and end devices 130 (e.g., end devices 130-1 through 130-X, where X>2), which have been previously described. As further illustrated, environment 200 includes users 205-1 through 205-Y, where Y>2 (also referred to as users 205 and generally or individually as user 205), cameras 210-1 through 210-3 (also referred to as camera 210 and generally or individually as camera 210), and a MEC server 215. User 205 may be a person participating in a video-based communication session, such as a video conferencing session. User 205 may operate end device 130. Camera 210 may be an integrated camera device or a peripheral/standalone device that captures video and audio. MEC server 215 may be an implementation of network device 105.

The number of users 205, end devices 130, and cameras 210 are exemplary. Although not illustrated, end devices 130-2 through 130-X may include at least one camera 210 (e.g., internally, peripherally, etc.). According to this exemplary environment, MEC server 215 may host a video-based communication software. According to this exemplary environment, end device 130 may include logic that provides the multi-camera switching service, as described herein.

Figure 3A:
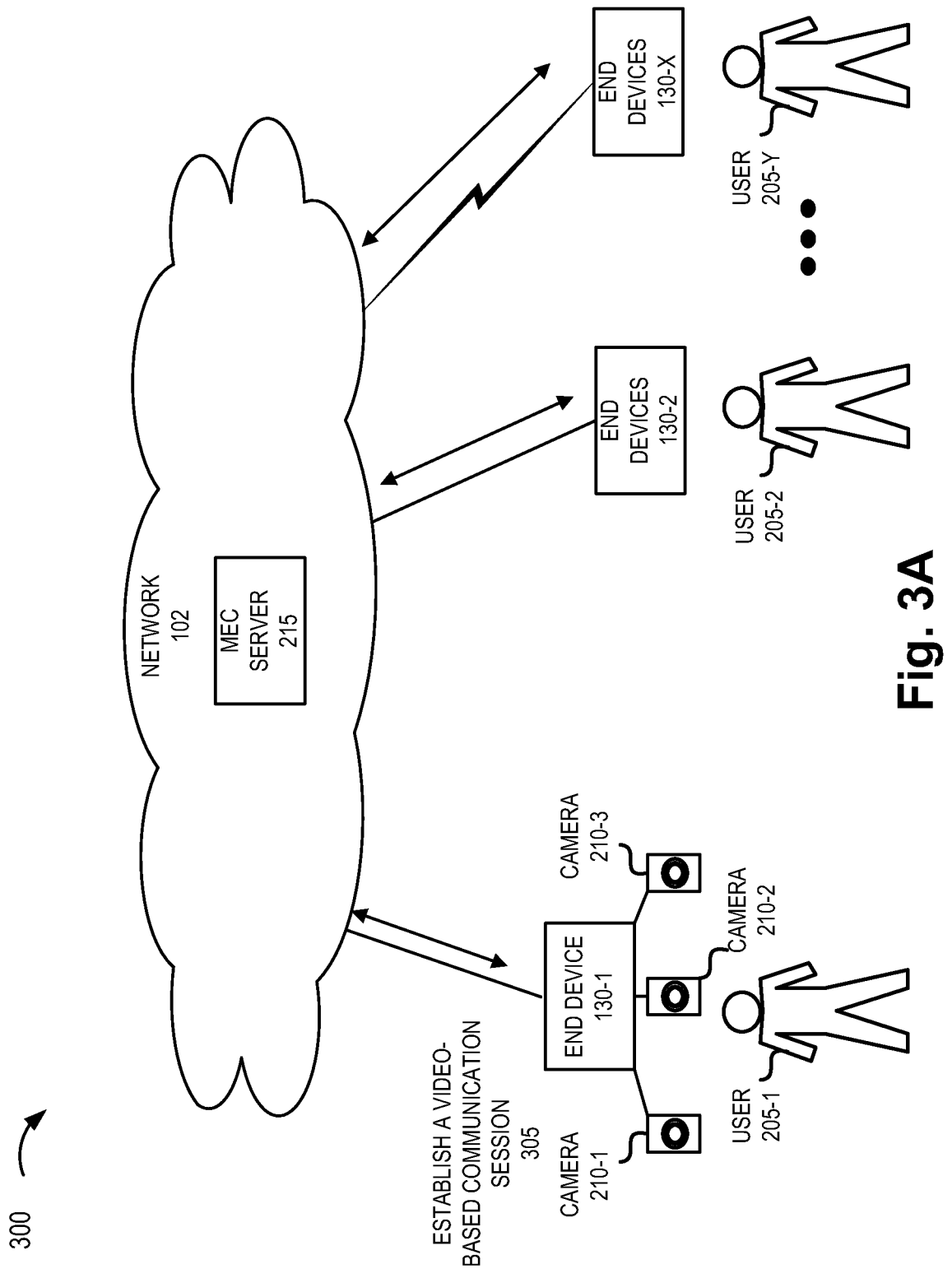
FIGS. 3A-3D are diagrams illustrating an exemplary process of an exemplary embodiment of the multi-camera switching service.

FIGS. 3A-3D are diagrams illustrating an exemplary process 300 of an exemplary embodiment of the multi-camera switching service. Referring to FIG. 3A, according to an exemplary scenario, assume users 205 wish to conduct a collaborative video-based meeting with each other. Assume that at least user 205-1 has a multiple camera system and wishes to use the multi-camera switching service. As illustrated, users 205 may establish a video-based communication session 305 with each other via network 102 and MEC server 215.

Figure 3B:
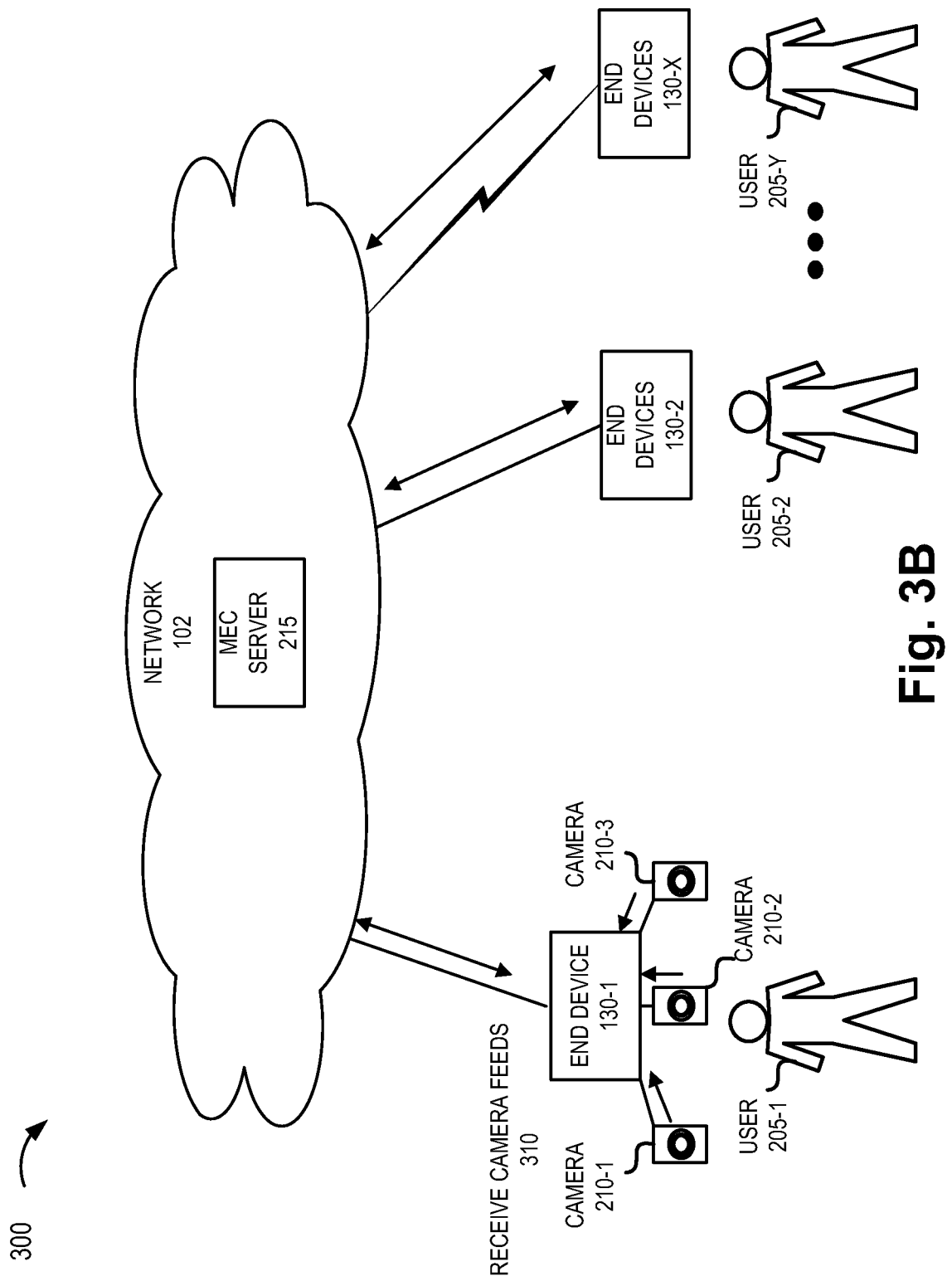
Figure 3C:
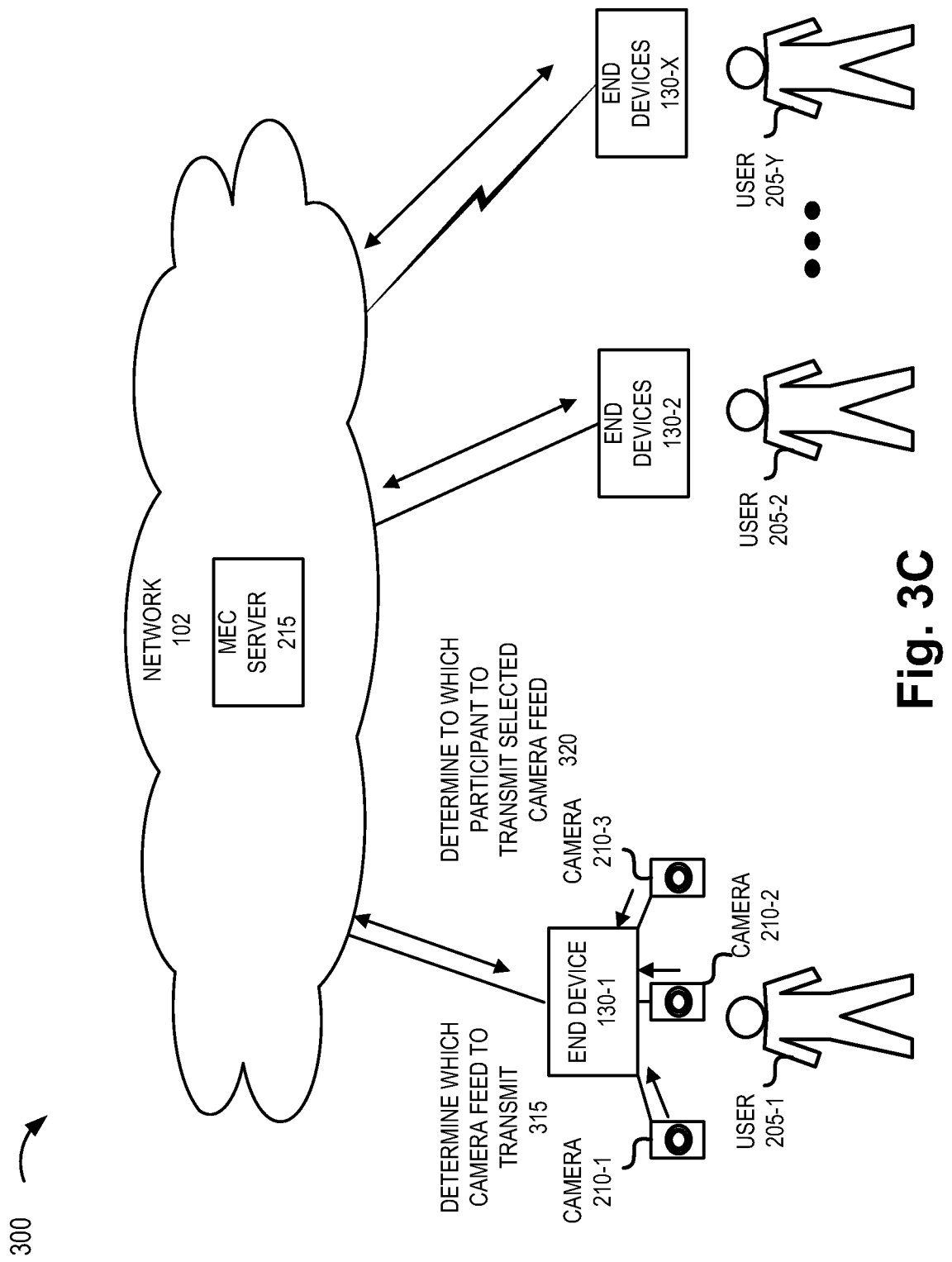

Referring to FIG. 3B, end device 130-1 may receive different camera feeds 310 from cameras 210 during the video-based communication session. Referring to FIG. 3C, end device 130-1 may determine which camera feed to transmit 315 to the other users 205 participating in the video-based communication session. For example, end device 130-1 may apply the camera switching criteria, such as described herein. By way of further example, end device 130-1 may analyze the camera feeds associated with cameras 210 and select a camera feed to transmit based on facial detection, user position (e.g., head position, body position, torso position, shoulder position, etc.), and/or other criteria (e.g., user gesticulations, user preferences, etc.), as described herein. Optionally, when all other users 205 may not be receiving the same camera feed, end device 130-1 may determine to which participant to transmit the selected camera feed 320. Additionally, according to an exemplary scenario, if end device 130-1 includes multiple end devices 130 (e.g., a cellphone and a laptop or another combination of end devices 130), the multi-camera switching service may select (and transmit) one stream between the multiple end devices 130.

Figure 3D:
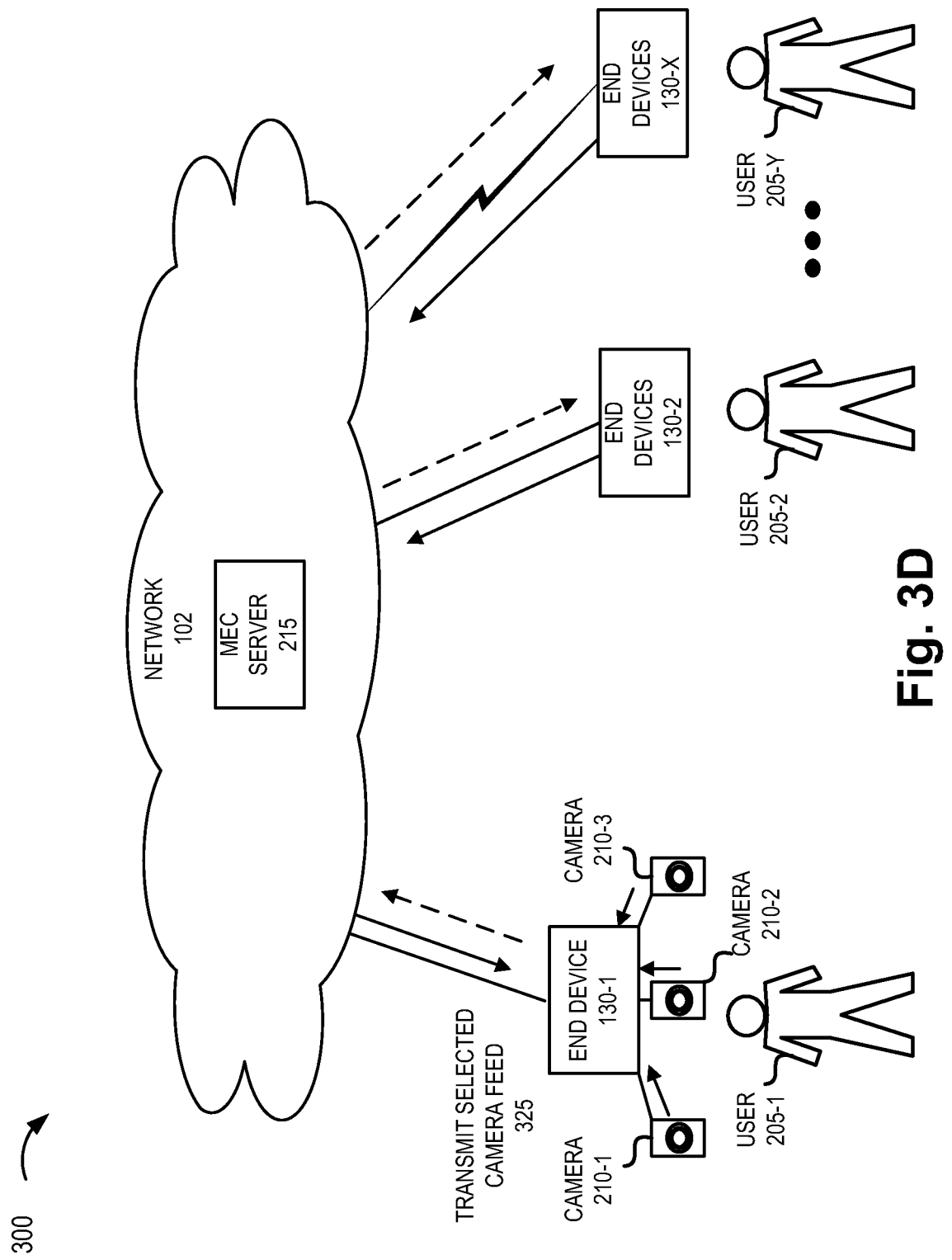

Referring to FIG. 3D, end device 130-1 may transmit the selected camera feed 325 to the appropriate user(s) 205.

FIGS. 3A-3D illustrate and describe exemplary process 300 of an exemplary embodiment of the multi-camera switching service, however according to other exemplary embodiments, the multi-camera switching service may include additional, different and/or fewer operations relative to those illustrated and described. For example, end device 130-1 may make other determinations related to the selection of the camera feed to transmit based on the debouncing service, the blending service, the default camera, and other considerations, as described herein. According to an exemplary embodiment, the criteria used to select a particular camera feed may be based on location information associated with another end device 130. For example, end device 130-1 may determine that two or more users 205 are located in proximity to one another, and the same camera feed may be selected for transmission to their respective end devices 130.

Additionally, as previously described, the multi-camera switching service may be implemented in whole or in part at MEC server 215, for example. According to such an exemplary embodiment, referring to FIG. 3B, the camera feeds received by end device 130-1 may be transmitted to MEC server 215. In response to receiving the camera feeds, MEC server 215 may perform similar analytics as those described in relation to end device 130-1. For example, MEC server 215 may determine which camera feed to transmit to the other users 205 based on camera switching criteria and/or other services of the multi-camera switching service, as described herein. Based on the selection of the camera feed, MEC server 215 may optionally select to which user(s) 205 to transmit the selected camera feed, and transmit the selected camera feed to the appropriate user(s) 205, as described above and herein.

FIG. 4 is a diagram illustrating exemplary components of a device 400 that may be included in one or more of the devices described herein. For example, device 400 may correspond to network devices 105, end device 130, camera 210, MEC server 215, and/or other types of devices, as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation, or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, learning, model-based, etc.

Memory/storage 415 includes one or multiple memories and/or one or multiple other types of storage mediums. For example, memory/storage 415 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 415 may be external to and/or removable from device 400, such as, for example, a Universal Serial Bus (USB) memory stick, a dongle, a hard disk, mass storage, off-line storage, or some other type of storing medium. Memory/storage 415 may store data, software, and/or instructions related to the operation of device 400.

Software 420 includes an application or a program that provides a function and/or a process. As an example, with reference to end device 130, software 420 may include an application that, when executed by processor 410, provides a function and/or a process of multi-camera switching service, as described herein. Additionally, with reference to network device 105 or MEC server 215, software 420 may include an application that, when executed by processor 410, provides a function and/or a process of multi-camera switching service, as described herein. Software 420 may also include firmware, middleware, microcode, hardware description language (HDL), and/or another form of an executable (e.g., applet, script, or the like). Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard.

Input 430 permits an input into device 400. For example, input 430 may include a keyboard, a mouse, a display, a touchscreen, a touchless screen, a button, a switch, an input port, a joystick, speech recognition logic, a camera, and/or some other type of visual, auditory, tactile, affective, olfactory, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 400 may be implemented in the same manner. For example, device 400 may be instantiated, created, deleted, or some other operational state during its life-cycle (e.g., refreshed, paused, suspended, rebooting, or another type of state or status), using well-known virtualization technologies. For example, network devices 105 and/or end device 130, as described herein, may be a virtualized device.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a function or a process described herein. Alternatively, for example, according to other implementations, device 400 performs a function or a process described herein based on the execution of hardware (processor 410, etc.).

Figure 5:
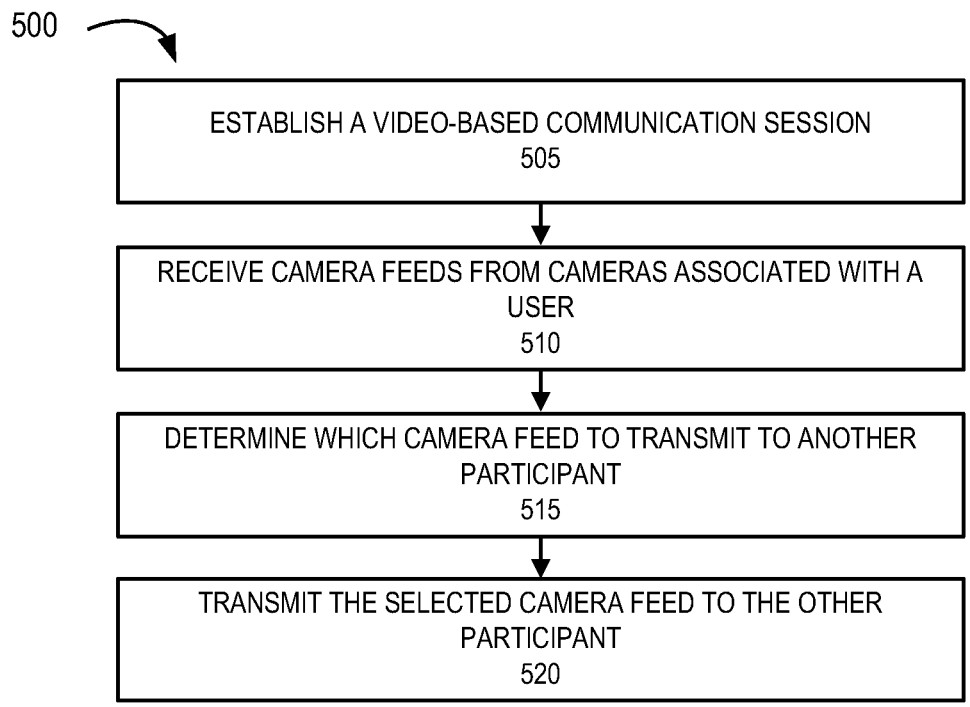
FIG. 5 is a flow diagram illustrating an exemplary process of an exemplary embodiment of the multi-camera switching service.

FIG. 5 is a flow diagram illustrating an exemplary process 500 of an exemplary embodiment of the multi-camera switching service. According to an exemplary embodiment, end device 130 may perform a step of process 500. According to an exemplary implementation, processor 410 executes software 420 to perform the step of process 500, as described herein. Alternatively, the step may be performed by execution of only hardware. In this way, end device 130 and/or the card logic may be configured to perform a step of process 500. According to other exemplary embodiments, process 500 may be performed by a network device (e.g., network device 105, MEC server 215, etc.). For purposes of description, however, process 500 is described below in relation to end device 130.

Referring to FIG. 5, in block 505, end device 130 may establish a video-based communication session with one or more other participants. For example, end device 130 may establish via a video-based application service, the video-based communication session with other participants. End device 130 may include multiple cameras and the video-based communication session may support the use of the multiple cameras associated with a user.

In block 510, end device 130 may receive camera feeds from cameras associated with a user. For example, end device 130 may receive camera feeds during the video-based communication session that pertain to the user.

In block 515, end device 130 may determine which camera feed to transmit to another user. For example, end device 130 may analyze the camera feeds based on the camera switching criteria and/or other service-based criteria/configurations (e.g., evaluate debouncing, blending, default camera, user preferences/configurations, etc.). Based on a result of the analysis, end device 130 may select a camera feed to transmit to the other participants. In block 520, end device 130 may transmit the selected camera feed to the other participants.

FIG. 5 illustrates an exemplary embodiment of a process of the multi-camera switching service, according to other exemplary embodiments, the multi-camera switching service may perform additional operations, fewer operations, and/or different operations than those illustrated and described.

Figure 6:
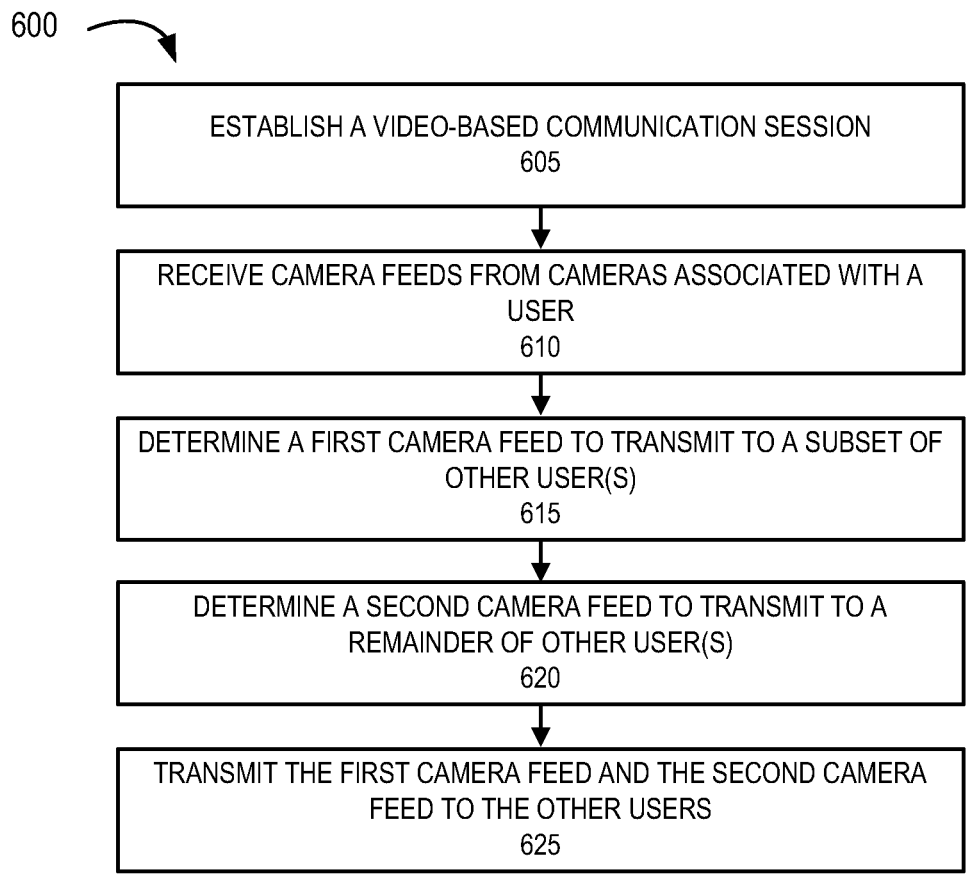
FIG. 6 is a flow diagram illustrating another exemplary process of an exemplary embodiment of the multi-camera switching service.

FIG. 6 is a flow diagram illustrating another exemplary process 600 of an exemplary embodiment of the multi-camera switching service. According to an exemplary embodiment, network device 105 may perform a step of process 600. According to an exemplary implementation, processor 410 executes software 420 to perform the step of process 600, as described herein. Alternatively, the step may be performed by execution of only hardware. According to other exemplary embodiments, process 600 may be performed by end device 130. For purposes of description, however, process 600 is described below in relation to network device 105.

Referring to FIG. 6, in block 605, network device 105 may establish a video-based communication session with its participants. For example, network device 105 may establish via a video-based application service, the video-based communication session with participants. According to an exemplary scenario, at least one of the participants may use the multi-camera switching service, as described herein. For example, network device 105 may support the use of multiple cameras associated with end device 130 and one of the participants or users.

In block 610, network device 105 may receive camera feeds from cameras associated with the user. For example, network device 105 may receive camera feeds during the video-based communication session that pertain to the user.

In block 615, network device 105 may determine a first camera feed to transmit to a subset of other user(s). For example, network device 105 may analyze the camera feeds based on the camera switching criteria and/or other service-based criteria/configurations (e.g., evaluate debouncing, blending, default camera, user preferences/configurations, etc.). Based on a result of the analysis, network device 105 may select a camera feed to transmit to the subset of other user(s).

In block 620, network device 105 may determine a second camera feed to transmit to the remainder of other user(s). For example, network device 105 may determine that a looped video feed or still picture of the user may be transmitted to the remainder of the other user(s).

In block 625, network device 105 may transmit the first camera feed and the second camera feed to the other users.

FIG. 6 illustrates an exemplary embodiment of a process of the multi-camera switching service, according to other exemplary embodiments, the multi-camera switching service may perform additional operations, fewer operations, and/or different operations than those illustrated and described.

Figure 7:
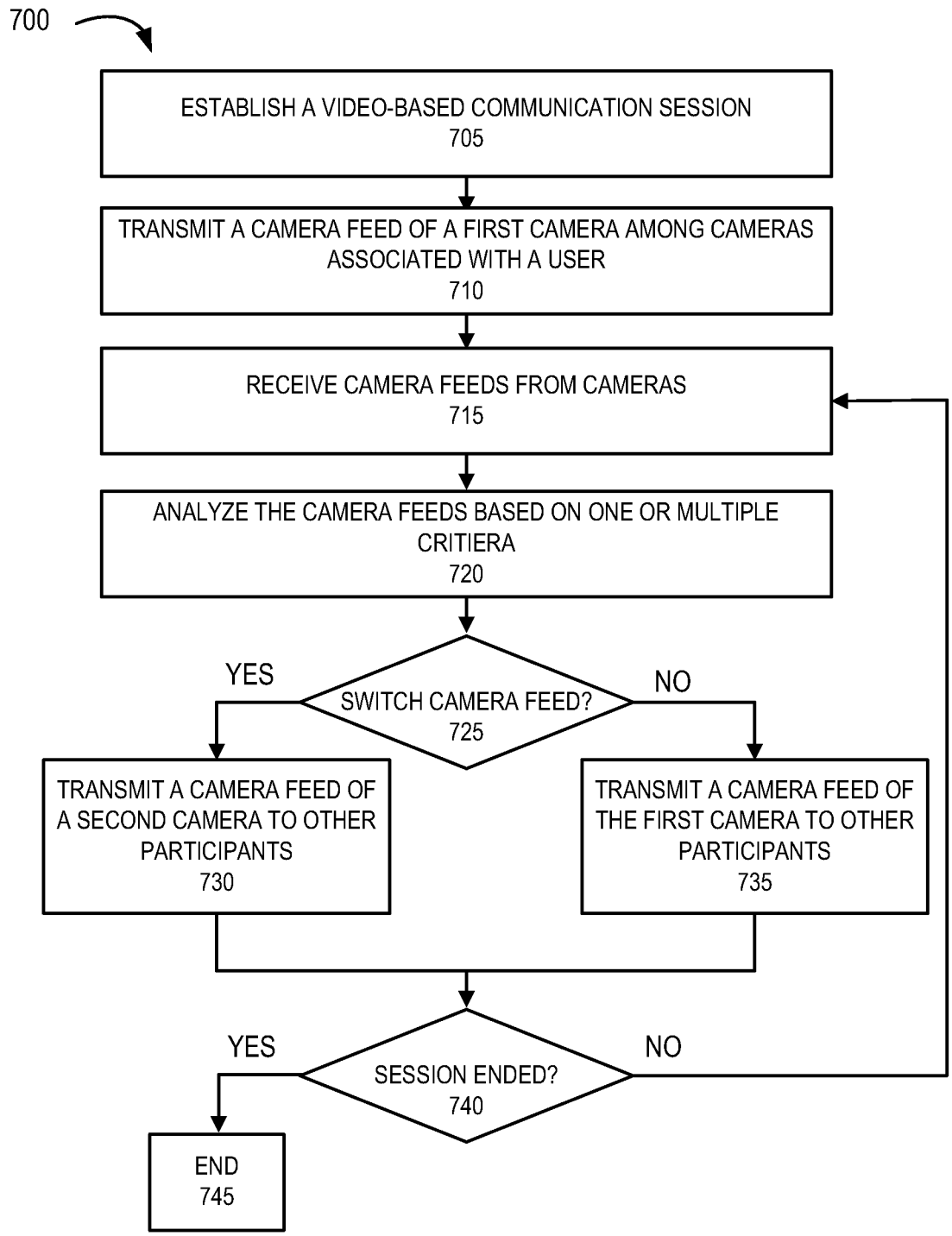
FIG. 7 is a flow diagram illustrating yet another exemplary process of an exemplary embodiment of the multi-camera switching service.

FIG. 7 is a flow diagram illustrating yet another exemplary process 700 of an exemplary embodiment of the multi-camera switching service. According to an exemplary embodiment, network device 105 may perform a step of process 700. According to an exemplary implementation, processor 410 executes software 420 to perform the step of process 700, as described herein. Alternatively, the step may be performed by execution of only hardware. According to other exemplary embodiments, process 700 may be performed by end device 130. For purposes of description, however, process 600 is described below in relation to network device 105.

Referring to FIG. 7, in block 705, network device 105 may establish a video-based communication session with its participants. For example, network device 105 may establish via a video-based application service, the video-based communication session with participants. According to an exemplary scenario, at least one of the participants may use the multi-camera switching service via end device 130, as described herein. For example, network device 105 may support the use of multiple cameras associated with end device 130 and one of the participants or users.

In block 710, network device 105 may transmit a camera feed of a first camera among the cameras associated with a user. For example, based on the switching criteria, the camera feed of the first camera may be transmitted to other participants of the video-based communication session.

In block 715, network device 105 may receive camera feeds from the cameras. For example, after or during the transmission of the camera feed of the first camera, the camera feeds associated with the camera and the user may be continuously received during the video-based communication session.

In block 720, network device 105 may analyze the camera feeds based on one or multiple criteria, as described herein. In block 725, based on a result of the analysis, network device 105 may determine whether to switch camera feeds. For example, network device 105 may determine whether the camera feed of the first camera should still be transmitted to the other participants or a camera feed of a second camera should be transmitted to the other participants.

When network device 105 determines to switch camera feed (block 725—YES), network device 105 may transmit a camera feed of a second camera feed to the other participants (block 730). When network device 105 determines to not switch camera feed (block 725—NO), network device 105 may continue to transmit the camera feed of the first camera to the other participants (block 735).

In block 740, network device 105 may determine whether the video-based communication session has ended. When network device 105 determines that the video-based communication session has ended (block 740—YES), process 700 may end (block 745). For example, the user may have ended his or her participation in the video-based communication session. When network device 105 determines that the video-based communication session has not ended (block 740—NO), process 700 may continue or return to block 715.

FIG. 7 illustrates an exemplary embodiment of a process of the multi-camera switching service, according to other exemplary embodiments, the multi-camera switching service may perform additional operations, fewer operations, and/or different operations than those illustrated and described.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations. The term "substantially" is used herein to represent the inherent degree of uncertainty that may be attributed to any quantitative comparison, value, measurement, or other representation. The term "substantially" is also used herein to represent the degree by which a quantitative representation may vary from a stated reference without resulting in a change in the basic function of the subject matter at issue.

In addition, while a series of blocks have been described regarding the processes illustrated in FIGS. 5, 6, and 7, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to the consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
   establishing, by a device, a video-based communication session with end devices associated with users;
   receiving, by the device, camera feeds associated with cameras and a first user of the users participating in the video-based communication session;
   analyzing, by the device, the camera feeds based on one or multiple criteria;
   selecting, by the device based on the analyzing, a first camera feed and a second camera feed, which differs from the first camera feed, of the camera feeds; and
   transmitting, by the device simultaneously, the first camera feed to a first subset of the end devices and the users and the second camera feed to a second subset of the end devices and the users, wherein the first subset and the second subset differ.

2. The method of claim 1, wherein the analyzing comprises:
   determining, by the device, which of the cameras the first user is facing based on facial detection.

3. The method of claim 1, wherein the analyzing comprises:
   evaluating, by the device, one or more user preferences of the first user pertaining to debouncing and blending services.

4. The method of claim 1, wherein the analyzing comprises:
   analyzing, by the device, a gesticulation of the first user included in at least one of the camera feeds.

5. The method of claim 1, wherein the selecting comprises:
   randomly selecting, by the device, a third camera feed for a preconfigured time period and then reselecting the first camera feed upon expiration of the preconfigured time period.

6. The method of claim 1, wherein the one or multiple criteria includes data indicating a default camera from among the cameras.

7. The method of claim 1, wherein the first camera feed includes at least one of fading or dissolving based on a user preference of the first user.

8. The method of claim 1, wherein the device is an end device operated by the first user.

9. A device comprising:
   a processor configured to:
   establish a video-based communication session with end devices associated with users;
   receive camera feeds associated with cameras and a first user of the users participating in the video-based communication session;
   analyze the camera feeds based on one or multiple criteria;
   select, based on the analysis, a first camera feed and a second camera feed, which differs from the first camera feed, of the camera feeds; and transmit simultaneously the first camera feed to a first subset of the end devices and the users and the second camera feed to a second subset of the end devices and the users, wherein the first subset and the second subset differ.

10. The device of claim 9, wherein, when analyzing, the processor is further configured to:
   determine which of the cameras the first user is facing based on facial detection.

11. The device of claim 9, wherein, when analyzing, the processor is further configured to:
   evaluate one or more user preferences of the first user pertaining to debouncing and blending services.

12. The device of claim 9, wherein, when analyzing, the processor is further configured to:
   analyze a gesticulation of the first user included in at least one of the camera feeds.

13. The device of claim 9, wherein, when selecting, the processor is further configured to:
   randomly select a third camera feed for a preconfigured time period and then reselecting the first camera feed upon expiration of the preconfigured time period.

14. The device of claim 9, wherein the one or multiple criteria includes data indicating a default camera from among the cameras.

15. The device of claim 9, wherein the first camera feed includes at least one of fading or dissolving based on a user preference of the first user.

16. The device of claim 9, wherein the device is an end device operated by the first user.

17. A non-transitory computer-readable storage medium storing instructions executable by a processor of a device, wherein the instructions are configured to:
   establish a video-based communication session with end devices associated with users;
   receive camera feeds associated with cameras and a first user of the users participating in the video-based communication session;
   analyze the camera feeds based on one or multiple criteria;
   select, based on the analysis, a first camera feed and a second camera feed, which differs from the first camera feed, of the camera feeds; and
   transmit simultaneously the first camera feed to a first subset of the end devices and the users and the second camera feed to a second subset of the end devices and the users, wherein the first subset and the second subset differ.

18. The non-transitory computer-readable storage medium of claim 17, wherein the instructions to analyze are further configured to:
   evaluate one or more user preferences of the first user pertaining to debouncing and blending services.

19. The non-transitory computer-readable storage medium of claim 17, wherein the instructions to select are further configured to:
   randomly select a third camera feed for a preconfigured time period and then reselecting the first camera feed upon expiration of the preconfigured time period.

20. The non-transitory computer-readable storage medium of claim 17, wherein the first camera feed includes at least one of fading or dissolving based on a user preference of the first user.

* * * * *